United States Patent
Nojima (10) Patent No.: US 7,729,041 B2
(45) Date of Patent: Jun. 1, 2010

(54) ELECTRO OPTIC DEVICE, METHOD OF MANUFACTURING ELECTRO OPTIC DEVICE, AND SCANNING TYPE OPTICAL APPARATUS

(75) Inventor: Shigeo Nojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/935,007

(22) Filed: Nov. 5, 2007

(65) Prior Publication Data
US 2008/0112042 A1  May 15, 2008

(30) Foreign Application Priority Data
Nov. 10, 2006  (JP) .............................. 2006-305122

(51) Int. Cl.
  G02F 1/29  (2006.01)
  G02F 1/03  (2006.01)
(52) U.S. Cl. .................. 359/315; 359/245; 359/259
(58) Field of Classification Search ................. 359/245, 359/247, 254–255, 259, 315
See application file for complete search history.

(56) References Cited

U.S. PATENT DOCUMENTS

| | | |
|---|---|---|
| 5,182,575 A | 1/1993 | Kato et al. |
| 5,272,561 A * | 12/1993 | Shibaguchi .................. 359/254 |
| 6,744,551 B1 * | 6/2004 | Chao .......................... 359/298 |
| 2007/0291346 A1 * | 12/2007 | Nagaeda et al. ............. 359/250 |

FOREIGN PATENT DOCUMENTS

| | | |
|---|---|---|
| JP | A-60-242434 | 12/1985 |
| JP | A-60-247627 | 12/1985 |
| JP | A-01-245780 | 9/1989 |
| JP | A-03-131818 | 6/1991 |

OTHER PUBLICATIONS

Nakamura et al., "Wide-angle, Low-voltage Electro-optic Beam Deflection Based on Space-charged-controlled Mode of Electrical Conduction in KtaIxNbx03". *Applied Physics Letters*. Sep. 28, 2006, vol. 89, No. 131115, p. 1-3.

* cited by examiner

*Primary Examiner*—Scott J Sugarman
*Assistant Examiner*—Dawayne A Pinkney
(74) *Attorney, Agent, or Firm*—Oliff & Berridge, PLC (57) ABSTRACT

An electro optic device includes an optical element in which a refractive index distribution, changes according to the intensity of an electric field generated therein such that an incident laser beam is scanned. First and second electrodes are provided on two opposite surfaces of the optical element. A distance between electrodes of the first and second electrodes of the optical element decreases continuously or in a stepwise manner from an emission end surface toward an incident end surface.

9 Claims, 6 Drawing Sheets

ELECTRO OPTIC DEVICE, METHOD OF MANUFACTURING ELECTRO OPTIC DEVICE, AND SCANNING TYPE OPTICAL APPARATUS

BACKGROUND

1. Technical Field

The present invention relates to an electro optic device, a method of manufacturing an electro optic device, and a scanning type optical apparatus.

2. Related Art

In recent years, a scanning type image display apparatus that displays an image by raster scanning beam-shaped light, such as a laser beam, on a projected surface has been suggested. In such apparatus, completely black display may be realized by stopping supply of a laser beam. Accordingly, it becomes possible to realize a display having a higher contrast than, for example, a projector using a liquid crystal light valve. Moreover, the image display apparatus using a laser beam is characterized in that, for example, the color purity is high because the laser beam has a single wavelength and the laser beam is easily shaped (easily focused) because the laser beam has a high coherence. Accordingly, the image display apparatus using a laser beam is expected as a high-quality display that realizes high resolution and high color reproducibility. Moreover, the scanning type image display apparatus does not have fixed pixels unlike a liquid crystal display, a plasma display, and the like. Accordingly, since there is no concept of the number of pixels, the scanning type image display apparatus is also advantageous in that the resolution is easily converted.

In order to generate an image in the scanning type image display apparatus, it is necessary to scan light in a two-dimensional manner using scanners, such as a polygon mirror and a galvano mirror. There is a method of scanning light in a two-dimensional manner by causing one scanner to swing in two directions of horizontal and vertical directions. In this case, however, there is a problem that the configuration and control of a scanning system become complicated. For this reason, there has been proposed a scanning type image display apparatus in which a pair of scanners, each of which scans light in a one-dimensional manner, are provided such that the scanners perform horizontal scanning and vertical scanning, respectively. In the related art, it is common to use a polygon mirror and a galvano mirror as both scanners. A projection apparatus that uses rotary polygon mirrors as both scanners is disclosed in JP-A-01-245780.

However, even though the apparatus using the polygon mirror is disclosed in JP-A-01-245780, there is a limit to the polygon mirror or the galvano mirror since the scanning frequency rises as an image format requests a high resolution. For this reason, a system in which an MEMS (Micro Electro Mechanical Systems) technique is applied to a high-speed scanner has been recently announced. The scanner (hereinafter, referred to as an MEMS scanner) that uses the MEMS technique is manufactured using microfabrication technology for semiconductor materials, such as silicon. In this case, a mirror supported by a torsion spring or the like is driven by an electrostatic force or the like. The scanner can scan light by causing the mirror to reciprocate using interaction between an electrostatic force and a restoring force of a spring. By using the MEMS scanner, it is possible to realize a scanner having characteristics of a high frequency and a large deflection angle compared with the known scanner. Accordingly, it becomes possible to display a high-resolution image.

Here, in order to realize a high-speed MEMS scanner, the mirror should reciprocate about a resonance point. Accordingly, taking light use efficiency or the like into consideration, a system in which a scanning line is scanned from left to right as viewed from a viewer and then a next scanning line is scanned from right to left (both-side scan) needs to be adopted.

On the other hand, a standard of an image signal was decided on the basis of a CRT (cathode ray tube). Accordingly, the image signal is scanned from left to right and then returns to the left within a short time so as to perform the scanning again in the right direction (one-side scanning). Thus, in the case of the MEMS scanner, some data should be displayed by reversing the order of input signals. As a result, it becomes complicated to control a signal.

Further, an electro optic (EO) scanner is considered as a scanning unit other than the MEMS scanner. The EO scanner is a device that changes the propagation direction of light transmitted through EO crystal by applying a voltage to the EO crystal. Thus, in the case of the EO scanner, a scanning angle can be controlled using a voltage. Accordingly, display based on one-side scanning becomes possible, in the same manner as the CRT.

Moreover, in the EO scanner, EO crystal is interposed between a pair of electrodes, and electrons are injected and the electron distribution is biased by applying a voltage to the electrodes. As a result, the distribution of a refractive index also changes due to the Kerr effect and incident light is deflected toward a side corresponding to a high refractive index, such that scanning of light becomes possible. In addition, since a slope of the refractive index distribution inside EO crystal is determined on the basis of the amount of electrons injected, that is, an applied voltage, the scanning angle of light emitted from the EO crystal may be controlled by changing the applied voltage.

In the case of such EO scanner, however, the following problems are still left.

In the EO crystal, a deflection angle of emitted light and the intensity of an electric field generated within the EO crystal are associated with each other, but an electric field intensity required to obtain an effective deflection angle is very high. Therefore, in order to efficiently obtain the large electric field intensity, it is necessary to make a distance between electrodes narrow. However, in terms of the structure of the EO scanner, the distance between electrodes affects an optical path of scanned light. Accordingly, if the distance is set to be too narrow, a laser beam propagating through the EO scanner touches the electrode, which causes a problem that light is not emitted from an emission end surface of EO crystal. Moreover, even if the light is emitted from the emission end surface of EO crystal, it is not possible to obtain a large deflection angle in the EO crystal in which the distance between electrodes is narrow, that is, in the EO crystal having a small thickness. That is, due to the structural problem described above, it is difficult to realize the improvement in efficiency of electric field intensity and an increase in deflection angle at the same time.

SUMMARY

An advantage of some aspects of the invention is that it provides an electro optic device capable of obtaining a large deflection angle and reducing power consumption, a method of manufacturing the electro optic device, and a scanning type optical apparatus.

According to an aspect of the invention, an electro optic device includes: an optical element in which a refractive index distribution changes according to the intensity of an electric field generated therein such that an incident laser beam is scanned. First and second electrodes are provided on two opposite surfaces of the optical element. A distance between electrodes of the first and second electrodes of the optical element decreases continuously or in a stepwise manner from an emission end surface toward an incident end surface.

In the electro optic device according to the aspect of the invention, an electric field is generated in the optical element by applying a voltage to the first and second electrodes. By the electric field, the refractive index distribution of the optical element increases or decreases continuously toward one direction. As a result, a laser beam propagating in the direction perpendicular to the electric field generated within the optical element is deflected from a low refractive index side toward a high refractive index side.

In the electro optic device according to the aspect of the invention, the distance between electrodes of the first and second electrodes of the optical element decreases continuously or in a stepwise manner from the emission end surface toward the incident end surface. That is, the laser beam propagating through the incident end surface of the optical element is not deflected much as compared with a laser beam propagating through the emission end surface. Accordingly, even if the distance between electrodes of the first and second electrodes close to the incident end surface is shorter than that of the first and second electrodes close to the emission end surface, the propagation of the laser beam is not obstructed by the first and second electrodes close to the incident end surface. Therefore, as compared with an optical element in which the distance between electrodes between the first electrode and the second electrode is constant from the incident end surface toward the emission end surface, an applied voltage is small. As a result, it is possible to suppress power consumption required to obtain the same scanning angle (deflection angle).

Further, in the electro optic device according to the aspect of the invention, preferably, the optical element includes a plurality of element portions, and the distance between electrodes in each of the element portions is constant and the distances between electrodes in the element portions are different from each other. In addition, preferably, the plurality of element portions are disposed to be in contact with each other in the order from the incident end surface such that the element portion having a relatively short distance between electrodes is located close to the incident end surface.

In the electro optic device described above, since the optical element is configured to include the plurality of element portions, it is preferable to use an optical element having a distance between electrodes corresponding to a deflection angle of a laser beam emitted from the emission end surface. Therefore, by providing element portions having an appropriate distance between electrodes, it is possible to reduce the power consumption.

Furthermore, in the electro optic device according to the aspect of the invention, preferably, a voltage is separately applied to each of the plurality of element portions.

In the electro optic device described above, since a voltage is separately applied to each of the plurality of element portions, it is possible to separately control the elements. Accordingly, it becomes possible to separately adjust the refractive index distribution within the plurality of element portions.

Furthermore, in the electro optic device according to the aspect of the invention, preferably, a voltage that allows refractive indices within a plane, which is perpendicular to interfaces between the element portions and include intersections between the interfaces and a central axis of a laser beam passing through the interfaces, to match each other is applied to the plurality of element portions.

In the electro optic device described above, a voltage that allows the refractive indices within a plane, which is perpendicular to interfaces between the element portions and include intersections between the interfaces and the central axis of a laser beam passing through the interfaces, to match each other is applied to the plurality of element portions. For this reason, when a laser beam propagating through the optical element passes through an interface between adjacent element portions, the laser beam is not refracted at the interface. Therefore, since the diameter of a laser beam does not increase, laser beams having the same diameter (constant diameter) can be scanned. As a result, it becomes possible to scan laser beams with high precision. In addition, for example, in the case when the scanning type optical apparatus according to the aspect of the invention is used as an image display apparatus, the size of each pixel does not change. As a result, a high-quality image can be displayed on a projected surface.

Furthermore, in the electro optic device according to the aspect of the invention, preferably, the plurality of element portions are disposed such that surfaces on which the first electrodes are disposed or surfaces on which the second electrodes are disposed are positioned on the same plane.

In the electro optic device described above, since the plurality of element portions are preferably disposed such that surfaces on which the first electrodes are disposed or surfaces on which the second electrodes are disposed are positioned on the same plane, it becomes easy to align the plurality of element portions.

Furthermore, in the electro optic device according to the aspect of the invention, preferably, the optical element has composition of $KTa_{1-x}Nb_xO_3$.

In the electro optic device described above, the optical element is crystal (hereinafter, referred to as 'KTN' crystal) having composition of $KTa_{1-x}Nb_xO_3$ (potassium tantalate niobate) which is a dielectric material having a high dielectric constant. The KTN crystal has a property in which cubic crystal changes to tetragonal crystal and rhombohedral crystal and a crystal system changes depending on the temperature. It is known that the cubic crystal has a secondary electro optic effect that is large. Particularly in a region near the phase transition temperature from cubic crystal to tetragonal crystal, a phenomenon in which the relative permittivity diverges occurs, and the secondary electro optic effect proportional to the square of relative permittivity indicates a very large value. Accordingly, in the case of crystal having the composition of $KTa_{1-x}Nb_xO_3$, an applied voltage required when changing the refractive index can be suppressed to be low, as compared with other crystal. As a result, it is possible to provide an electro optic device capable of reducing the power consumption.

According to another aspect of the invention, a method of manufacturing the electro optic device described above includes: forming the element portions separately; and bonding the element portions to each other.

In the method of manufacturing the electro optic device according to the aspect of the invention, the element portions are separately formed. Accordingly, in the case of using dielectric crystal element portions, it is possible to increase the number of element portions obtained when cutting a plurality of element portions from crystal. That is, if optical elements in which the distance between electrodes of the first and second electrodes increases in a stepwise manner are integrally formed, a fragment is generated and waste of crystal occurs. However, according to the aspect of the invention, the element portions can be manufactured without any fragment in crystal by separately forming the element portions. As a result, since wasted element portions can be reduced, an improvement in the yield is also expected.

In addition, according to still another aspect of the invention, a scanning type optical apparatus includes: a light source that emits a laser beam; and a scanning unit that scans the laser beam emitted from the light source toward a projected surface. The scanning unit includes the electro optic device described above.

In the scanning type optical apparatus according to the aspect of the invention, light emitted from the light source is scanned toward the projected surface by means of the scanning unit. At this time, by using the electro optic device having a large deflection angle as described above, the scanning type optical apparatus using the scanning unit that can correspond to high resolution is realized. As a result, it is possible to obtain the scanning type optical apparatus capable of displaying an image on the projected surface with higher resolution without deterioration of image quality while reducing the power consumption.

Moreover, in the scanning type optical apparatus according to the aspect of the invention, preferably, the electro optic device performs horizontal scanning.

In the scanning type optical apparatus described above, the electro optic device performs the horizontal scanning. Accordingly, by using, for example, an inexpensive polygon mirror for vertical scanning, it is possible to realize a scanning type optical apparatus that is not expensive but has a high performance.

In addition, the 'horizontal scanning' refers to high-speed scanning of two directional scanning, and the vertical scanning is low-speed scanning.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electro optic device, a method of manufacturing an electro optic device, and a scanning type optical apparatus according to embodiments of the invention will be described with reference to the accompanying drawings. In addition, the scale of each member is appropriately changed in order to have a recognizable size in the drawings described below.

First Embodiment

Figure 1:
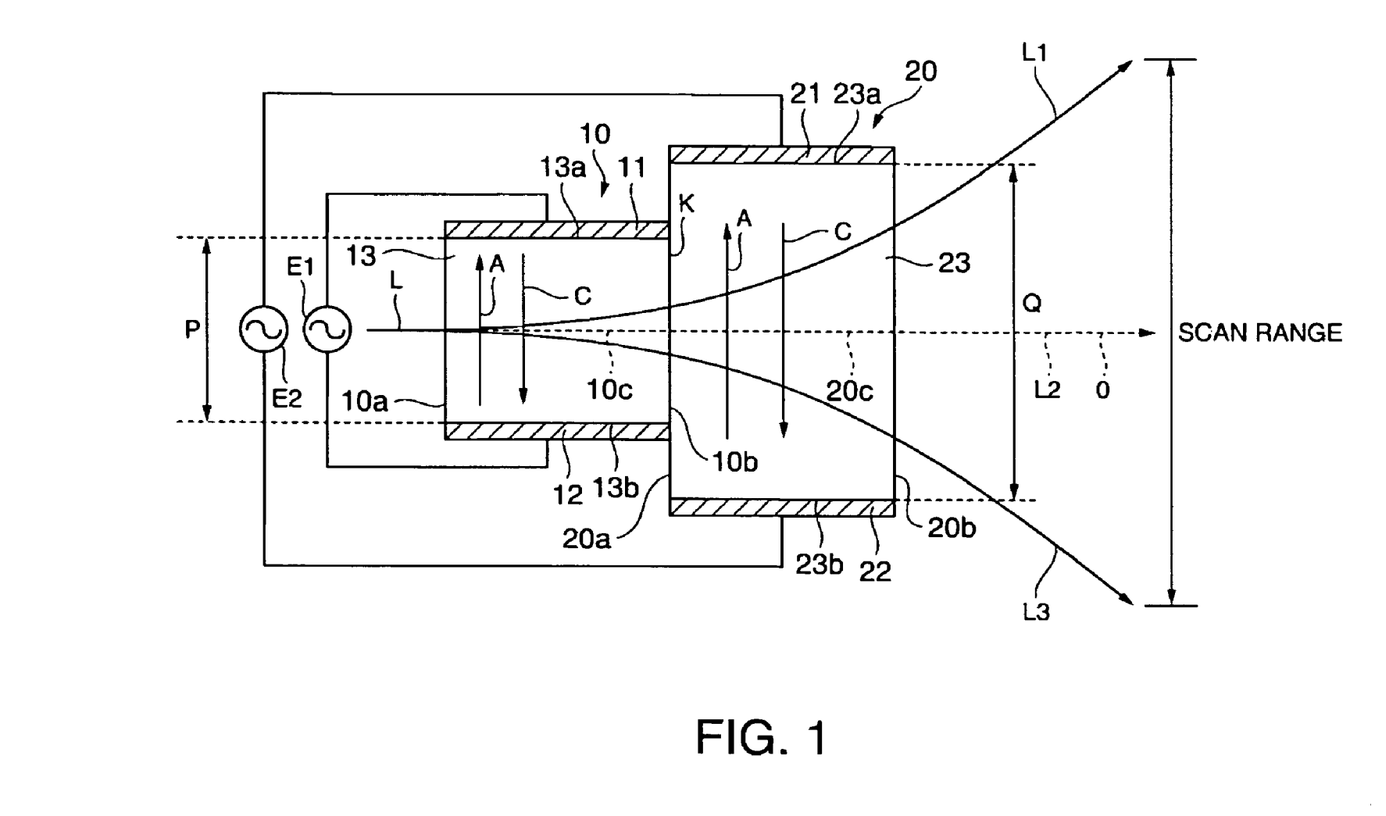
FIG. 1 is a cross-sectional view illustrating main parts of an electro optic device according to a first embodiment of the invention.

In an electro optic device 1, the refractive index distribution changes according to the intensity of an electric field generated therein, such that a laser beam propagating therethrough is scanned. Specifically, the electro optic device 1 includes a first electro optic element 10, which has an incident end surface 10a on which a laser beam is incident, and a second electro optic element 20, which has an emission end surface 20b from which a laser beam is emitted, as shown in FIG. 1. The first electro optic element 10 and the second electro optic element 20 are disposed such that an emission end surface 10b of the first electro optic element 10 and an incident end surface 20a of the second electro optic element 20 are in contact with each other in a state where central axes 10c and 20c of the first and second electro optic elements 10 and 20 match each other.

Moreover, configurations of the first and second electro optic elements 10 and 20 are equal to each other, but sizes of the first and second electro optic elements 10 and 20 and voltages applied to the first and second electro optic elements 10 and 20 are different from each other. Accordingly, as for the configurations of the first and second electro optic elements 10 and 20, only the configuration of the first electro optic element 10 will be described.

The first electro optic element 10 includes a first electrode 11, a second electrode 12, and an optical element (element portion) 13.

The optical element 13 is dielectric crystal (electro optic crystal) having an electro optic effect. In the present embodiment, the optical element 13 is formed of a crystal material having the composition of KTN (potassium tantalate niobate; $KTa_{1-x}Nb_xO_3$). Moreover, the first electrode 11 is formed on an upper surface (one surface) of the optical element 13 having a cubic shape, and the second electrode 12 is formed on a lower surface (opposite surface) 13b of the optical element 13. A power source E1 that applies a voltage is connected to the first and second electrodes 11 and 12. In addition, as shown in FIG. 1, sizes of the first and second electrodes 11 and 12 in the propagation direction of a laser beam L propagating through the optical element 13 are almost equal to each other. Thus, an electric field is generated in the optical element 13 between the first and second electrode 11 and 12. For example, an electric field is generated in the direction from the second electrode 12 to the first electrode 11 (direction indicated by arrow 'A') when a voltage of −100 V is applied to the first electrode 11 and a voltage of 0 V is applied to the second electrode 12, and an electric field is generated in the direction from the first electrode 11 to the second electrode 12 (direction indicated by arrow 'C') when a voltage of +100 V is applied to the first electrode 11 and a voltage of 0 V is applied to the second electrode 12.

Moreover, a distance between electrodes of the first and second electrodes 11 and 12, that is, the size of the optical element 13 in the electric field direction A or C is set to 'P'.

Figure 2:
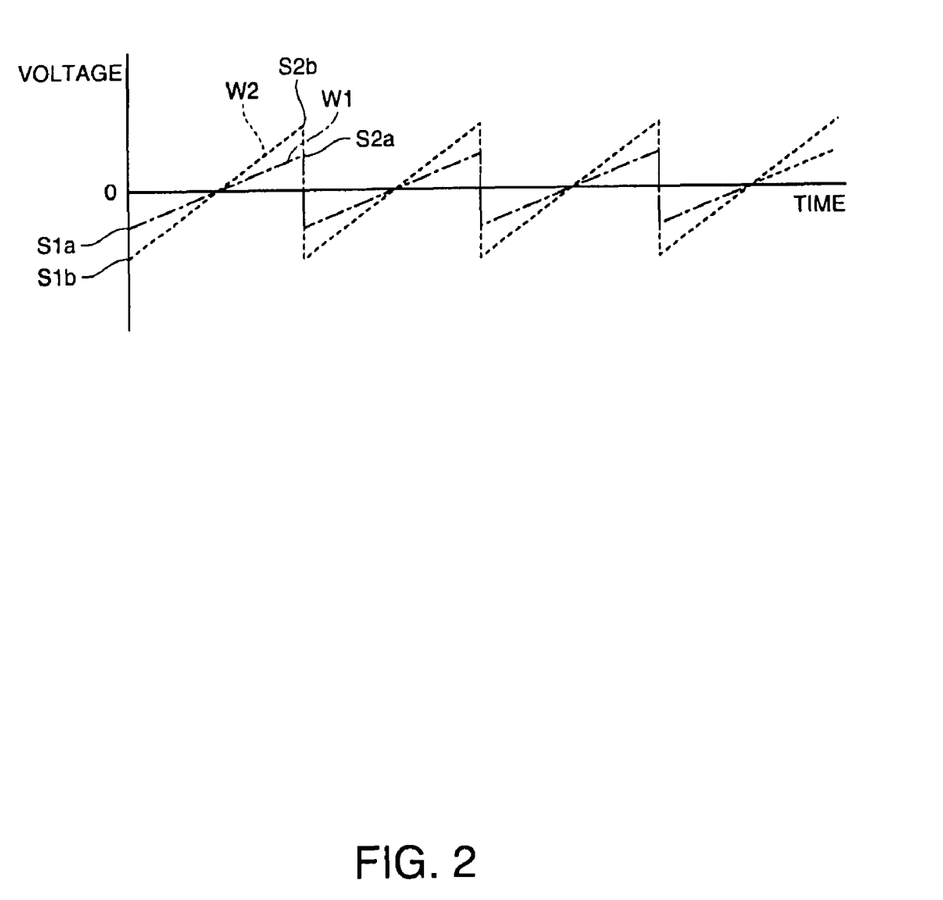
FIG. 2 is a view illustrating a waveform of a voltage applied to electrodes of the electro optic device according to the first embodiment of the invention.

Next, a waveform of a voltage applied to the first electro optic element will be described.

A waveform of a voltage applied from the power source E1 to the first electrode 11 is a saw-tooth waveform W1, for example, as shown by dashed-dotted line in FIG. 2. To the first electrode 11, a voltage that gradually decreases from an initial voltage value S1a (for example, −100V) to 0 V is applied and a voltage that gradually rises from 0 V to a maximum voltage value S2a (for example, +100 V) is applied. Further, when a voltage applied to the first electrode 11 reaches the maximum voltage value S2a, the initial voltage value S1a is applied. Furthermore, an optical path of a laser beam emitted from the optical element 13 when a voltage applied to the first electrode 11 is 0 V is set to 'O'. In addition, a voltage applied to the second electrode 12 is fixed to 0 V.

Next, the second electro optic element 20 will be described.

The second electro optic element 20 includes a first electrode 21, a second electrode 22, and an optical element (element portion) 23 having a cubic shape, in the same manner as the first electro optic element 10. The first electrode 21 is formed on an upper surface 23a of the optical element 23 and the second electrode 22 is formed on a lower surface 23b of the optical element 23. Further, a power source E2 that applies a voltage is connected to the first and second electrode 21 and 22, and a voltage applied to the second electrode 22 is fixed to 0 V.

Furthermore, assuming that a distance between electrodes of the first and second electrodes 21 and 22, that is, the size of the optical element 23 in the electric field direction A or C is set to 'Q', the size 'P' of the optical element 13 is about a half of the size Q of the optical element 23.

Next, a voltage waveform applied to the second electro optic element will be described.

A waveform of a voltage applied from the power source E2 to the first electrode 21 is a saw-tooth waveform W2, for example, as shown by dotted line in FIG. 2. A phase of the waveform W2 is equal to that of the waveform W1, but the amplitude (initial voltage value S1b and maximum voltage value S2b) of the waveform W2 is different from that of the waveform W1.

That is, to the first electrode 21, a voltage that gradually decreases from the initial voltage value S1b (for example, −200V) to 0 V is applied and a voltage that gradually rises from 0 V to a maximum voltage value S2b (for example, +200 V) is applied. In addition, when a voltage applied to the first electrode 21 reaches the maximum voltage value S2b, the initial voltage value S1b is applied.

A method of manufacturing an electro optic device will now be described.

First, crystal corresponding to the size of the optical element 13 of the first electro optic element 10 is cut from plate-shaped KTN crystal. Then, crystal corresponding to the size of the optical element 23 of the second electro optic element 20 is cut from another plate-shaped KTN crystal. Then, the first and second electrodes 11 and 12 are formed on the upper and lower surfaces 13a and 13b of the optical element 13, respectively, using a vapor deposition method or a sputtering method. In the same manner, the first and second electrodes 21 and 22 are formed on the upper and lower surfaces 23a and 23b of the optical element 23. Then, the first electro optic element 10 and the second electro optic element 20 are bonded to each other with an optical adhesive. Then, as the optical adhesive, it is preferable to use an optical adhesive having a refractive index close to those of the optical elements 13 and 23. Thus, since it is possible to prevent a laser beam, which propagates from the first electro optic element 10 to the second electro optic element 20, from being reflected by an optical adhesive, generation of stray light within the electro optic device 1 can be suppressed.

In addition, the first electro optic element 10 and the second electro optic element 20 may be directly bonded to each other without an adhesive interposed therebetween.

Next, scan of a laser beam emitted from the electro optic device 1 will be described.

A laser beam, which is emitted from the emission end surface 20b of the second electro optic element 20 by changing a voltage applied to the first and second electrodes 11 and 21 by means of the power sources E1 and E2, is scanned within a scan range having the optical path O as a reference in the on-dimensional direction.

Specifically, as shown in FIG. 1, when a voltage whose initial voltage value is −100 V is applied to the first electrode 11 of the first electro optic element 10 and a voltage whose initial voltage value −200 V is applied to the first electrode 21 of the second electro optic element 20, an electric field in the direction indicated by arrow 'A' is generated in the first electro optic element 10 and the second electro optic element 20. Accordingly, the laser beam L propagating through the optical element 13 is deflected toward the first electrode 11 and is then emitted from the emission end surface 10b. Then, a laser beam L1 is incident on the incident end surface 20a of the second electro optic element 20 without being refracted on an interface K between the first and second electro optic elements 10 and 20. The laser beam L1 incident on the second electro optic element 20 is deflected toward the first electrode 21 due to an electric field generated in the optical element 23 and is then emitted from the emission end surface 20b.

Then, a voltage that gradually rises from an initial voltage value of −200 V to 0 V is applied to the first electrode 11, and a voltage that gradually rises from an initial voltage value of −100 V to 0 V is applied to the first electrode 21. As a result, a laser beam propagating through the optical element 13 and the optical element 23 is illuminated toward the middle of the scan range and is then emitted from the emission end surface 20b of the second electro optic element 20 at an angle of deviation that gradually decreases. Thereafter, when the voltage applied to the first electrode 11 of the first electro optic element 10 and the first electrode 21 of the second electro optic element 20 reaches 0 V, a laser beam L2 emitted from the emission end surface 20b of the second electro optic element 20 propagates on the optical path O and is then illuminated onto a middle part of the scan range.

Then, a voltage that gradually rises from 0 V to +100 V is applied to the first electrode 11, and a voltage that gradually rises from 0 V to +200 V is applied to the first electrode 21. As a result, the electric field direction generated within the optical element 13 and the optical element 23 changes to the direction indicated by arrow 'C', such that the laser beam propagating through the optical element 13 and the optical element 23 is deflected toward the second electrode 12 and the second electrode 22. Then, the laser beam propagating through the optical element 13 and the optical element 23 is emitted from the emission end surface 20b of the second electro optic element 20 at an angle of deviation that gradually increases.

Then, a maximum voltage of +100 V is applied to the first electrode 11 and a maximum voltage of +200 V is applied to the first electrode 21. As a result, a laser beam L3 propagating through the optical element 13 and the optical element 23 is emitted from the emission end surface 20b and arrives at an end of the scan range.

Next, the electro optic device according to the embodiment of the invention will be compared with a known electro optic device.

Figure 3:
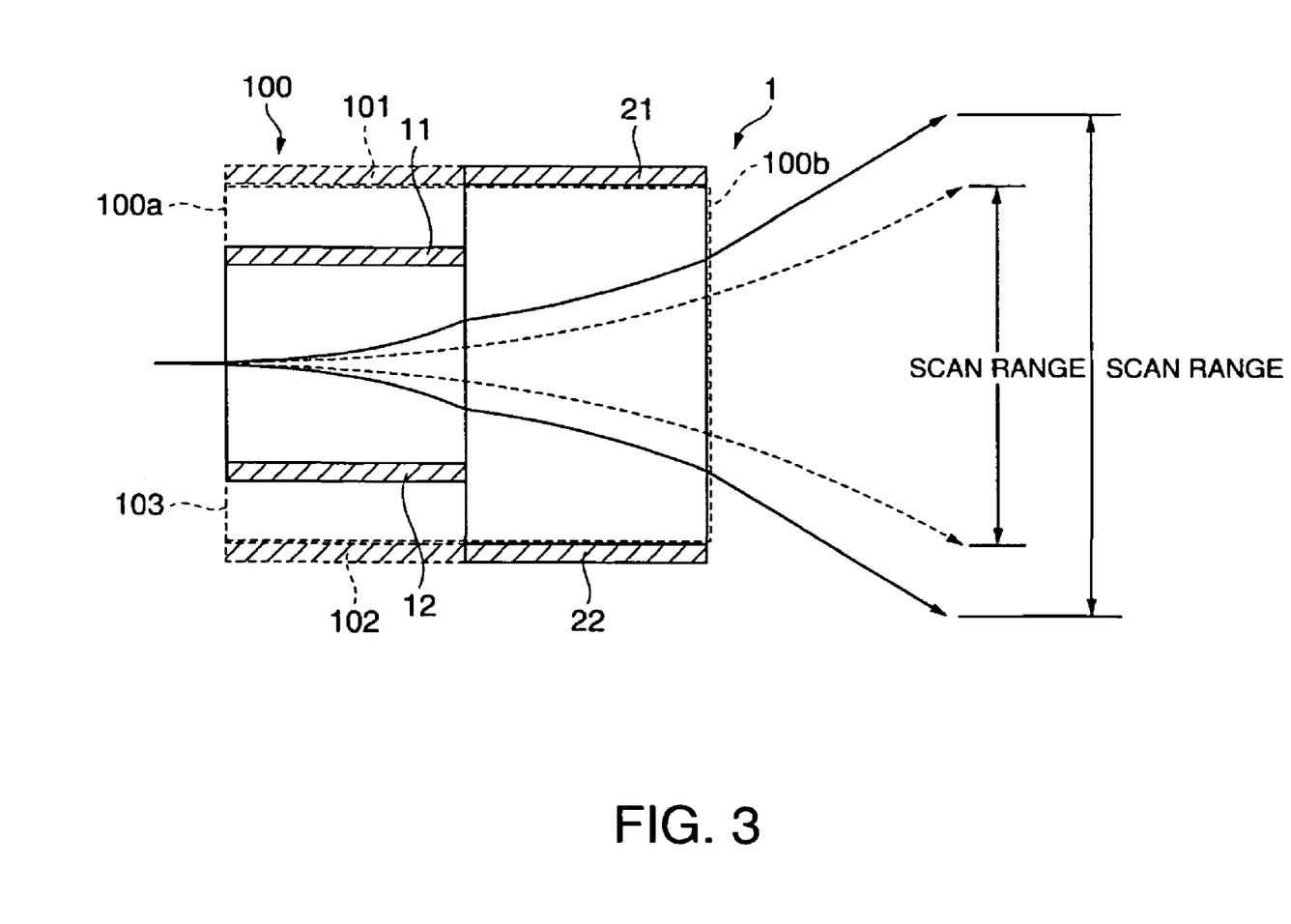
FIG. 3 is a cross-sectional view illustrating main parts in order to compare a scan range of the electro optic device according to the embodiment of the invention and a scan range of a known electro optic device with each other.

As shown in FIG. 3, a known electro optic device 100 includes an optical element 103 having a constant width (equal to the size Q of the second electro optic element) from an incident end surface 100a to an emission end surface 100b. In the same manner as the electro optic device 1 according to the present embodiment, a first electrode 101 and a second electrode 102 are formed on the optical element 103. Here, a voltage of −200 V to +200 V is applied to the first electrode 101 of the known electro optic device 100, and the voltage of −200 V to +200 V is also applied to the first electrode 11 and the first electrode 21 of the electro optic device 1 according to the present embodiment. At this time, a scan range of a laser beam (solid line) emitted from the electro optic device 1 according to the present embodiment is larger than a scan range of a laser beam (dotted line) emitted from the known electro optic device 100, since a change in refractive index is large in the optical element 13 small in size even if the same voltage is applied. That is, in the electro optic device 1 according to the present embodiment, in order to obtain the same amount of deflection angle as in the known electro optic device 100, a voltage applied to the first electrode 11 and the first electrode 21 needs to be lower than a voltage applied to the first electrode 101.

The electro optic device 1 according to the present embodiment is configured to be reduced in size in a stepwise manner in the order of the optical element 23 and the optical element 13. That is, in the electro optic device 1 according to the present embodiment, the optical element 23 and the optical element 13 having the size P smaller than the size Q of the optical element 23 are provided in contact with each other. In other words, even if the size P of the optical element 13 facing the incident end surface 10a, on which the amount of deflection angle of a laser beam propagating therethrough is small, is set to be small, propagation of the laser beam is not obstructed by the first and second electrodes 11 and 12. Therefore, since a laser beam can be emitted from the emission end surface 20b even if the size P of the optical element 13 is small, a voltage that is applied to the first electrode 11 and the first electrode 21 in order to obtain the same scanning angle (deflection angle) as the known electro optic device 100 becomes low. As a result, it is possible to suppress the power consumption required for driving the electro optic device 1.

That is, in the electro optic device 1 according to the present embodiment, it is possible to obtain a large deflection angle and to reduce the power consumption.

In the present embodiment, the electro optic device 1 has a two-stage configuration using the first electro optic element 10 and the second electro optic element 20. However, three or more element portions may be provided such that the electro optic device 1 has a multi-stage configuration. Thus, by providing three or more element portions, a voltage applied to an electrode of each of the element portions can be controlled more finely. Accordingly, since the size of an element portion facing an incident end surface can be made much smaller, it is possible to make a voltage applied to an electrode smaller. As a result, since a voltage can be efficiently applied to an electrode, suppression of power consumption in the entire electro optic device can be further expected.

Further, in the case of applying the same voltage to the first electrode 11 of the first electro optic element 10 and the first electrode 21 of the second electro optic element 20, the power source E1 and the power source E2 may not be provided separately but a common power source may be provided. Thus, the scan range of a laser beam (solid line) emitted from the electro optic device 1 according to the present embodiment is larger than the scan range of a laser beam (dotted line) emitted from the known electro optic device 100, since the change in refractive index in the optical element 13 having a smaller size becomes large even if the same voltage as in the known electro optic device is applied.

Moreover, the optical element 13 and the optical element 23 maybe integrally formed.

In addition, although the first electro optic element 10 and the second electro optic element 20 have been configured to be in contact with each other, the first electro optic element 10 and the second electro optic element 20 may not be necessarily in contact with each other. That is, the first electro optic element 10 and the second electro optic element 20 may be disposed to be apart from each other such that a laser beam is not obstructed by an electrode of a subsequent-stage scanner (second electro optic element 20 in the present embodiment).

First Modification of the Third Embodiment

In the first embodiment shown in FIG. 1, the central axis 10c of the first electro optic element 10 and the central axis 20c of the second electro optic element 20 match each other. However, it is possible to use an electro optic element 30 in which an upper surface 13a of the optical element 13 and an upper surface 23a of the optical element 23 are positioned on the same plane. The first modification will now be described with reference to FIG. 4.

Figure 4:
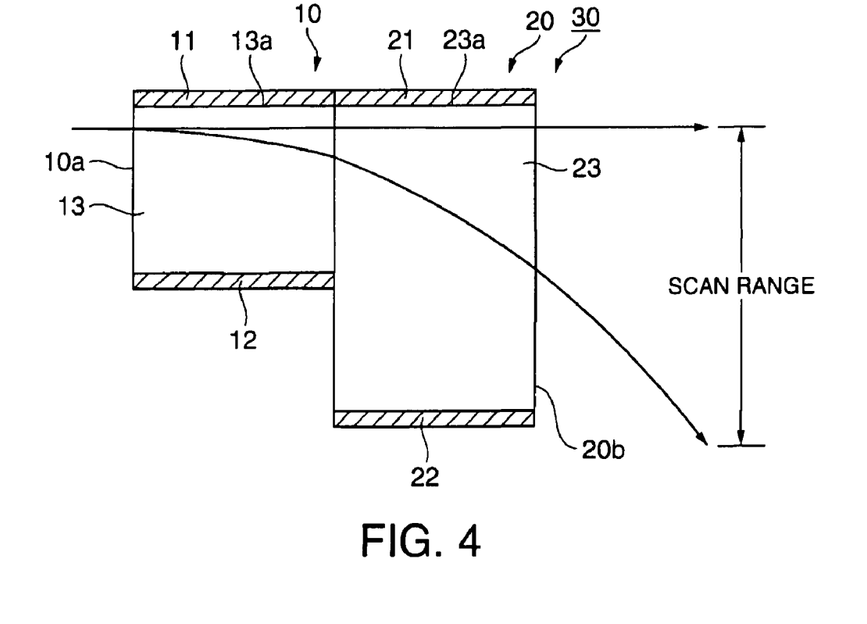
FIG. 4 is a cross-sectional view illustrating main parts of an electro optic device according to a modification of the first embodiment of the invention.

In this configuration, as shown in FIG. 4, a laser beam is incident from a side, which is close to the first electrode 11, of the incident end surface 10a of the first electro optic element 10. Accordingly, the electro optic element 30 according to the first modification performs one-side scanning where an incident laser beam is scanned to one side with the laser beam as a reference. That is, laser beams incident on the optical elements 13 and 23 are deflected toward only the second electrodes 12 and 22 due to the refractive index distribution of the first and second electro optic elements 10 and 20.

Thus, by causing a laser beam to be incident from a side of the optical element 13 close to the first electrode 11, it is possible to make the scan range large. As described above, in the electro optic device 30 according to the first modification, the first electro optic element 10 and the second electro optic element 20 are disposed such that the upper surface 13a of the optical element 13 and the upper surface 23a of the optical element 23 are positioned on the same plane. Accordingly, the first electro optic element 10 and the second electro optic element 20 can be easily aligned.

In addition, the first electro optic element 10 and the second electro optic element 20 may be disposed such that the lower surface 13b of the optical element 13 and the lower surface 23b of the optical element 23 are positioned on the same plane. In such configuration, it is possible to make the scan range large by causing a laser beam to be incident from a side of the incident end surface 10a close to the second electrode 12.

Second Modification of the First Embodiment

In the first embodiment shown in FIG. 1, the size P of the optical element 13 facing the incident end surface 10a is smaller than the size Q of the optical element 23 facing the emission end surface 20b, that is, the electro optic device 1 is configured to be reduced in size in the stepwise manner. However, it is possible to use an electro optic element 35 having a configuration that is continuously reduced in size. The second modification will now be described with reference to FIG. 5.

Figure 5:
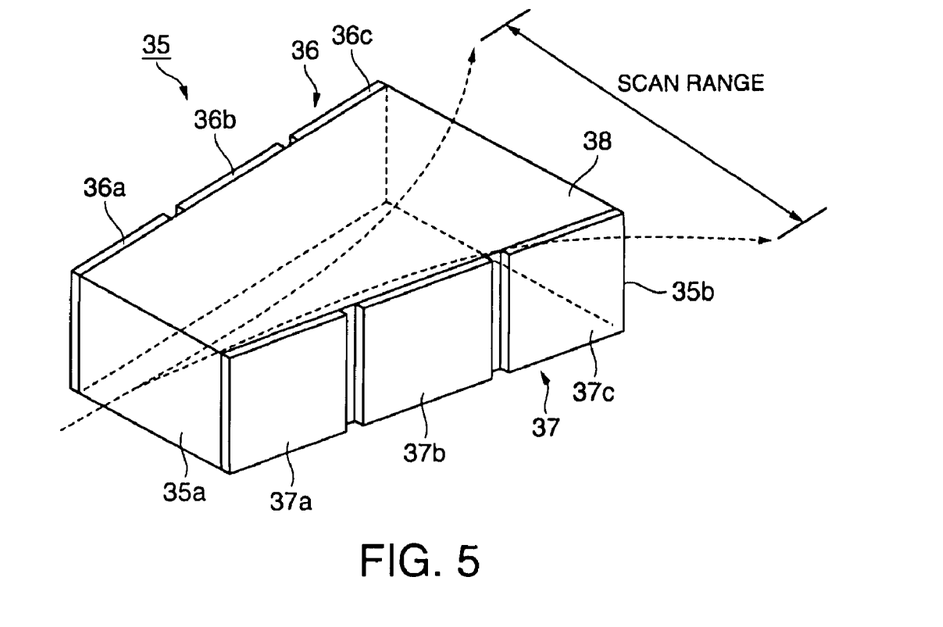
FIG. 5 is a cross-sectional view illustrating main parts of an electro optic device according to another modification of the first embodiment of the invention.

That is, as shown in FIG. 5, the electro optic device 35 includes an optical element 38 in which a distance between electrodes of a first electrode 36 and a second electrode 37 is continuously reduced from an emission end surface 35b toward an incident end surface 35a. In addition, the first electrode 36 has a plurality of electrode parts 36a, 36b, and 36c in the direction in which a laser beam propagates. Similarly, the second electrode 37 has a plurality of electrode parts 37a, 37b, and 37c. In such configuration, a voltage increasing in the order of the electrode parts 36a, 36b, and 36c is applied to the first electrode 36.

By causing the optical element 38 to have, for example, a shape based on the locus of a laser beam that arrives at an end of a scan range, it is possible to suppress the size of the optical element 38 to the minimum. In addition, as the shape of the optical element 38, the shape of a cross section perpendicular to a central axis is not limited to a rectangular shape but may be a circular shape.

Second Embodiment

Next, a second embodiment of the invention will be described with reference to FIG. 6. In addition, in each embodiment to be described below, components common to those in the electro optic device 1 according to the first embodiment are denoted by the same reference numerals, and the description thereof will be omitted.

An electro optic device 40 according to the present embodiment is different from the electro optic device 1 according to the first embodiment from the view point of a voltage applied to the first electrode 11 and the second electrode 21.

Figure 6:
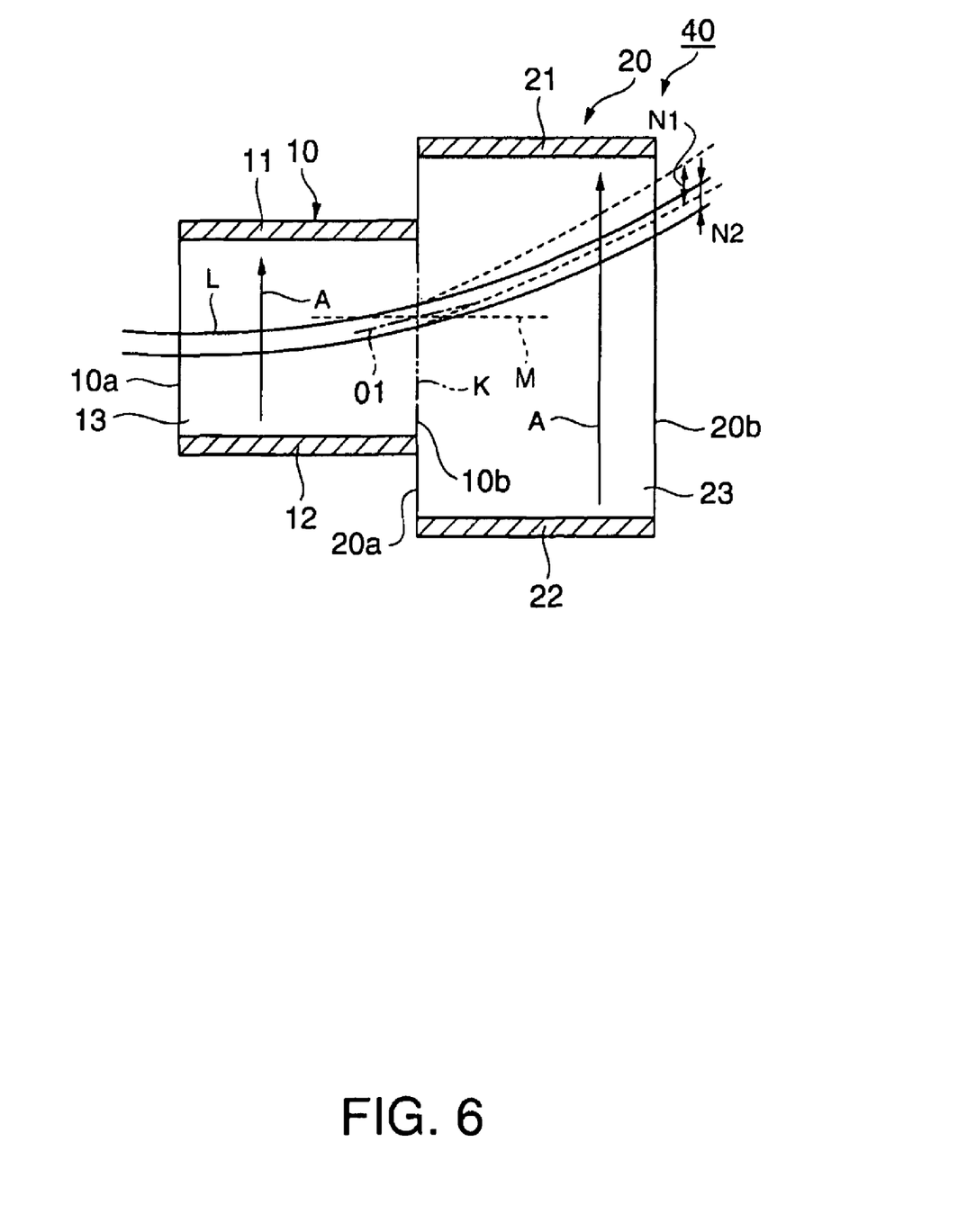
FIG. 6 is a cross-sectional view illustrating main parts of an electro optic device according to a second embodiment of the invention.

First, as shown in FIG. 6, a plane that is perpendicular to an interface K between the first electro optic element 10 and the second electro optic element 20 and includes an intersection between the interface K and a central axis O1 of a laser beam L passing through the interface K, is assumed to be 'M'.

In addition, a voltage that allows a refractive index of the optical element 13 and a refractive index of the optical element 23 on the plane 'M' to match each other is applied to the first electrode 11 of the first electro optic element 10 and the first electrode 21 of the second electro optic element 20.

Here, in the case when a voltage that does not allow the refractive indices of the optical elements 13 and 23 on the plane 'M' to match each other is applied to the first and second electrodes 11 and 21, the beam diameter N1 of a laser beam propagating through the second electro optic element 20 gradually increases due to a difference in the refractive indices of the optical elements 13 and 23, as shown by dotted lines in FIG. 6. That is, in the case when the refractive indices match each other like the present embodiment, the beam diameter N2 is constant. In contrast, the beam diameter N1 increases. Accordingly, in the case when such an electro optic device is used for an image display apparatus, for example, a variation in the size of each pixel occurs.

Specifically, as shown in FIG. 6, when a voltage whose initial voltage value is −100 V is applied to the first electrode 11 and a voltage whose initial voltage value −200 V is applied to the first electrode 21, an electric field in the direction indicated by arrow 'A' is generated in the first electro optic element 10 and the second electro optic element 20. Accordingly, the laser beam L propagating through the optical element 13 is deflected toward the first electrode 11 and is then emitted from the emission end surface 10b. Then, the laser beam L is incident on the incident end surface 20a of the second electro optic element 20 without being refracted on the interface K between the first and second electro optic elements 10 and 20. The laser beam incident on the second electro optic element 20 is deflected toward the first electrode 21 due to an electric field generated in the optical element 23 and is then emitted from the emission end surface 20b.

In the electro optic device 40 according to the present embodiment, the same effects as in the electro optic device 1 according to the first embodiment can be obtained. Further, in the electro optic element 40 according to the present embodiment, the laser beam L propagating through the optical element 13 is not refracted on the interface K when the laser beam L passes through the interface K between the optical elements 13 and 23 adjacent to each other. Therefore, since the beam diameter of a laser beam does not increase, laser beams having the same beam diameter (constant size) can be scanned. As a result, it becomes possible to scan laser beams with high accuracy. Furthermore, in the case when the electro optic device 40 according to the present embodiment of the invention is used for an image display apparatus, for example, a variation in the size of each pixel does not occur. As a result, it becomes possible to display a high-quality image on a projected surface.

Third Embodiment

Next, a third embodiment of the invention will be described with reference to FIG. 7.

In the present embodiment, an image display apparatus (scanning type optical apparatus) 50 including the electro optic device 1 according to the first embodiment as a scanning unit will be described.

Figure 7:
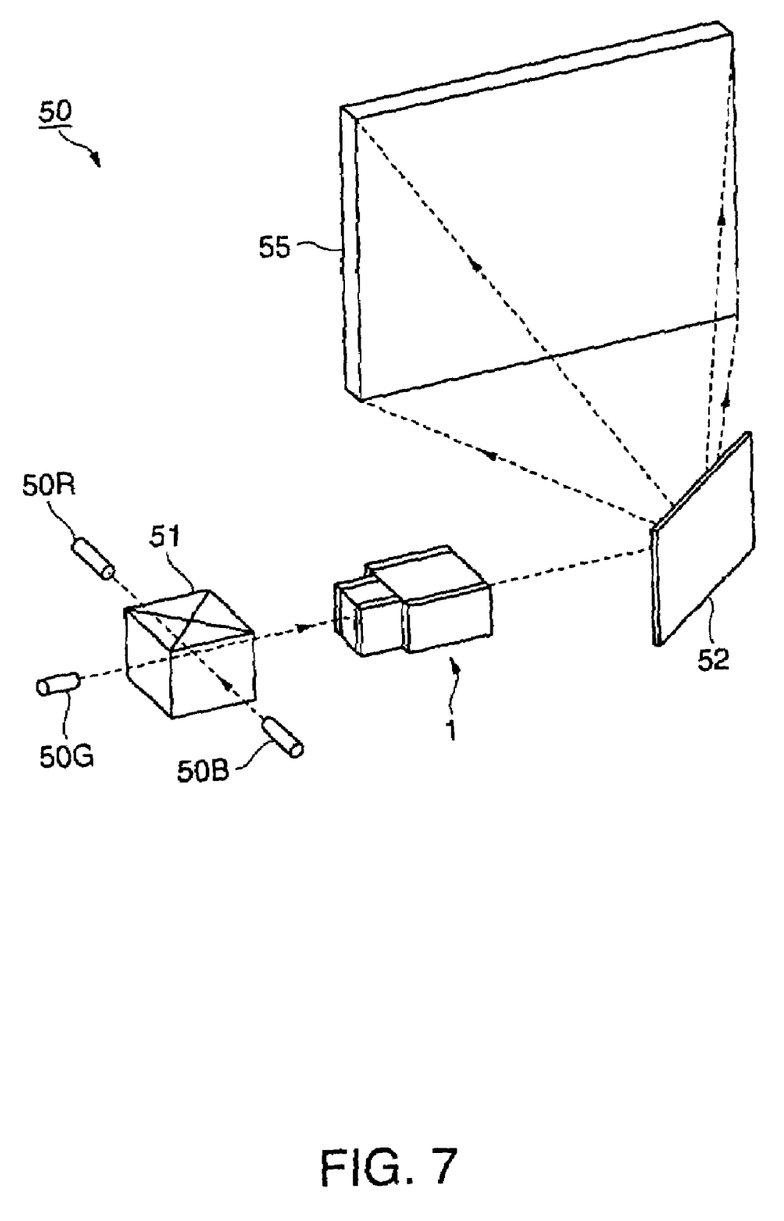
FIG. 7 is a cross-sectional view illustrating main parts of a scanning type optical apparatus according to a third embodiment of the invention.

As shown in FIG. 7, an image display apparatus 50 includes: a red-colored light source (light source) 50R that emits a red-colored laser beam; a green-colored, light source (light source) 50G that emits a green-colored laser beam; a blue-colored light source (light source) 50B that emits a blue-colored laser beam; a cross dichroic prism 51; an electro optic device 1 that scans a laser beam emitted from the cross dichroic prism 51 in a horizontal direction of a screen 55; a galvano mirror 52 that causes the laser beam emitted from the electro optic device 1 to be scanned in a direction vertical to the screen 55; and the screen (projected surface) 55 onto which the laser beam scanned from the galvano mirror 52 is projected.

Next, a method of projecting an image onto the screen 55 using the image display apparatus 50 having the above configuration according to the present embodiment will be described.

Laser beams emitted from the light sources 50R, 50G, and 50B are mixed in the cross dichroic prism 51 and are then incident on the electro optic device 1. The laser beams incident on the electro optic device 1 are scanned in the horizontal direction of the screen 55 and are then scanned in the direction vertical to the screen 55 by the galvano mirror 52, thereby being projected onto the screen 55.

Since the image display apparatus 50 according to the present embodiment uses the electro optic device 1 having a large deflection angle as a scanning unit, the image display apparatus 50 can meet the resolution, such as 4 k of DCI (Digital Cinema Initiatives) specifications. Therefore, an image can be displayed on a screen with higher resolution without deterioration of image quality while reducing the power consumption.

In addition, the scanning unit that is formed using the electro optic device 1 can perform scanning at higher speed than the MEMS scanner. Thus, like the present embodiment, by using an electro optic scanner as a horizontal scanning unit and the galvano mirror 52 (movable scanning unit that reflects light by movement) as a vertical scanning unit, a high-performance image display apparatus can be realized. In addition, an inexpensive polygon mirror that is one of the movable scanning units may be used to perform scanning instead of the galvano mirror 52. By using the inexpensive polygon mirror, it becomes possible to perform a highly efficient image display while suppressing the cost.

In addition, it should be understood that the technical scope of the invention is not limited to the above embodiments, but various modifications may be made without departing from the spirit and scope of the invention.

For example, in the embodiments described above, the KTN crystal has been exemplified as an optical element. However, the optical element is not limited to the KTN crystal, but an element whose refractive index linearly varies may be used. For example, dielectric crystal, such as $LiNbO_3$ (lithium niobate), having an electro optic effect may be used. However, in the case of crystal having composition, such as $LiNbO_3$, a deflection angle at the time of scanning is small and a driving voltage is high compared with the KTN crystal. Accordingly, it is preferable to use the KTN crystal.

The entire disclosure of Japanese Patent Application No. 2006-305122, filed Nov. 10, 2006 is expressly incorporated by reference herein.

What is claimed is:

1. An electro optic device comprising:
    an optical element in which a refractive index distribution changes according to the intensity of an electric field generated therein such that an incident laser beam is scanned; and
    first and second electrodes provided on two opposite surfaces of the optical element,
    a distance between electrodes of the first and second electrodes of the optical element decreasing continuously or in a stepwise manner from an emission end surface toward an incident end surface,
    the first and second electrodes being comprised of a plurality of electrode parts,
    the optical element including a plurality of element portions,
    the distance between electrodes in each of the element portions being constant and the distances between electrodes in the element portions being different from each other,
    the plurality of element portions being disposed to be in contact with each other in the order from the incident end surface such that the element portion having a relatively short distance between electrodes is located close to the incident end surface,
    the laser beam being deflected toward the first electrode or the second electrode,
    the optical element having a distance between electrodes in the element portions corresponding to a deflection angle of the laser beam emitted from the emission end surface,
    a voltage being separately applied to each of the plurality of element portions,
    the voltage applied to each of the plurality of element portions having a same frequency and a same phase, and
    a larger voltage being applied to a thicker element portion.

2. The electro optic device according to claim 1,
    a voltage that allows refractive indices within a plane, which is perpendicular to interfaces between the element portions and include intersections between the interfaces and a central axis of a laser beam passing through the interfaces, to match each other being applied to the plurality of element portions.

3. The electro optic device according to claim 1,
    the plurality of element portions being disposed such that surfaces on which the first electrodes are disposed or surfaces on which the second electrodes are disposed are positioned on the same plane.

4. The electro optic device according to claim 1,
    the optical element having composition of $KTa_{1-x}Nb_xO_3$; wherein $0<x<1$.

5. A method of manufacturing the electro optic device according to claim 1, comprising:
    forming the element portions separately; and
    bonding the element portions to each other.

6. The electro optic device according to claim 1, the voltage being proportional to a thickness of the element.

7. The electro optic device according to claim 1, a shape of the optical element being one of rectangular and circular.

8. A scanning type optical apparatus comprising:
    a light source that emits a laser beam; and
    a scanning unit that scans the laser beam emitted from the light source toward a projected surface,
    the scanning unit including the electro optic device according to claim 1.

9. The scanning type optical apparatus according to claim 8,
    the electro optic device performing horizontal scanning.

* * * * *